UNITED STATES PATENT OFFICE.

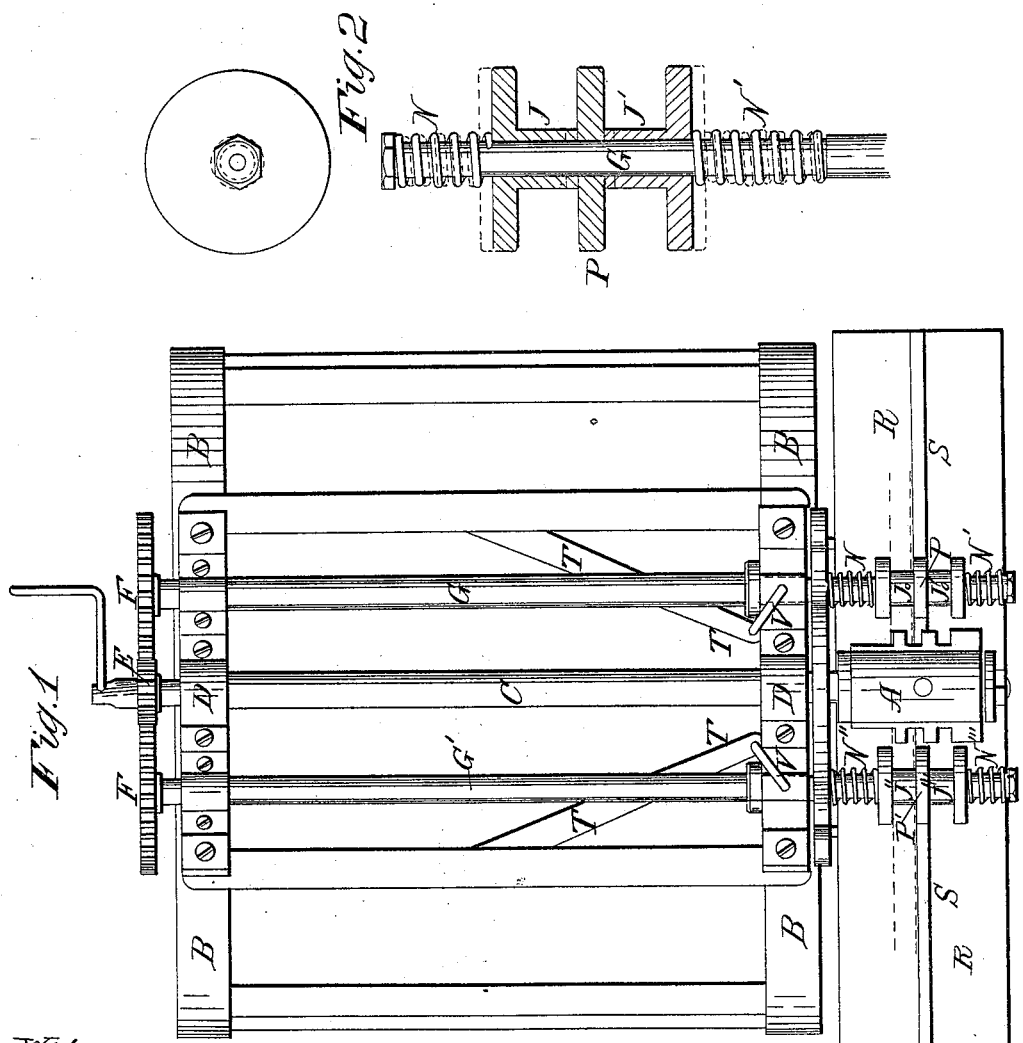

H. H. BAKER, OF NEW MARKET, NEW JERSEY.

TONGUING AND GROOVING MACHINE.

Specification of Letters Patent No. 25,313, dated September 6, 1859.

*To all whom it may concern:*

Be it known that I, H. H. BAKER, of New Market, in the county of Middlesex and State of New Jersey, have invented a new and useful Improvement in Tonguing and Grooving Machines; and I do hereby declare that the following is a full, clear, and exact description thereof, reference being had to the accompanying drawings, and to the letters of reference marked thereon, in which—

Figure 1, represents a top view of a machine for tonguing and grooving showing my improvement attached thereto. Fig. 2, shows a horizontal section of one set of adjustable feed rollers enlarged, and in two positions.

This invention relates to an improvement in the feed rollers for tonguing and grooving machines, for keeping the boards down upon the table and feeding them edgewise under the cutter head as it rotates.

My invention consists in passing the boards to be tongued and grooved under rollers, which serve as feed and pressure rollers, having flanges cast on their outer edges, which press the faced edge of the board, as it is being fed to the cutters, up firmly against an annular ring keyed to the roller shaft by helical or other suitable springs, which permit the rollers to be laterally adjusted and set to suit the various thicknesses of boards to be matched, at the same time the rollers have a sufficient play to admit of the variations in the thickness of the same board, as hereinafter described and represented.

In the machine represented by the drawings the cutter head, shafting, and gearing, for giving motion to the rollers, and the table upon which the boards rest are in many respects similar to those in common use for tonguing and grooving machines, these consist of a rotary cutter head A, on one end of a shaft C, which is mounted in a frame B, and turning in suitable journal boxes D, on the top of said frame. On the opposite end of the shaft C, is keyed a pinion E, which gives motion respectively to spur wheels F, F′, fixed on the ends of roller shafts G, G′, which are placed on either side of the intermediate shaft C. The shafts G, G′, proceed out from one side of the frame B, and receive the feed rollers J, J′, J″, J‴, and springs N, N′, N″, N‴, for keeping the rollers pressed against the intermediate rings or flanges P, P′, which are keyed rigidly to the shafts G, G′, and against which the sides of the board are pressed in its movement under the cutters of cutter head A, the board being placed between the flanges and rings as indicated by the red lines of Fig. 1.

R, is the table upon which the boards rest in their passage under the cutterhead, and S, is a gage bar against which the side of the board is held during the operation of tonguing and grooving. The table R, is made adjustable up or down by any suitable device which will raise or depress it parallel with the feed rollers.

The operation of this machine may be described as follows:—The thickness of the boards, which have been previously dressed on one side, is determined and the rollers are then adjusted to this thickness by inserting a ring, or its equivalent, between them and the fixed rings, so that the space between the flanges of the rollers and the ring, will be slightly less than the thickness of the boards. The machine is then set in motion and the board is first passed under the roller J, which will open to admit it and by the action of the spring N, upon the roller J, the board will be held up against the ring P, and against the gage-strip S, upon the table R. In this manner the board will pass under the grooving cutters by the action of the feed roller J, and be received by a similar, but slightly larger roller J′, the spring N, of which acts with greater force upon this roller to keep the board against the ring P′. The board after having passed through this operation is then turned and placed upon the table again, but on the opposite side of the gage S, and passed under the rollers J″, J‴, for receiving the tongue, the action of the rollers upon the board being the same as that described for the first operation.

The roller shafts G, G′, have a slight vertical play, common to machines of this description, and are held down in their bearings by springs T, T, through the medium of rods V, V, which latter are hooked on their heads so as to press the journal blocks upon the shafts. The rollers are prevented from turning on the shaft by pins which pass through them and into slots on the periphery of the shafts.

What I claim as my invention and desire to secure by Letters Patent is,

The employment of flanged feed rollers having a lateral play and acted upon by suitable springs, in combination with the fixed intermediate rings or flanges P, P', or their equivalents when arranged and operating essentially in the manner and for the purpose herein specified.

H. H. BAKER.

Witnesses:
WM. TUSCH,
M. M. LIVINGSTON.